F. E. COTTRELL.
SAFETY HOOK.
APPLICATION FILED AUG. 30, 1910.

996,619. Patented July 4, 1911.

Inventor
F. E. Cottrell,
By James Shuhy&Co.,
Attorneys

Witnesses
Phil E. Barnes
Thos. E. Turpin

UNITED STATES PATENT OFFICE.

FREDRICK E. COTTRELL, OF BISHOP, CALIFORNIA.

SAFETY-HOOK.

996,619.  Specification of Letters Patent.  Patented July 4, 1911.

Application filed August 30, 1910. Serial No. 579,770.

*To all whom it may concern:*

Be it known that I, FREDRICK E. COTTRELL, citizen of the United States, residing at Bishop, in the county of Inyo and State of California, have invented new and useful Improvements in Safety-Hooks, of which the following is a specification.

My present invention pertains to safety hooks—*i. e.*, hooks embodying movable means for preventing casual release of the devices held by the hooks.

The object of the invention is to provide a safety hook of simple and strong construction, embodying easily manipulated and reliable means for retaining the hook in engagement with the device to which it is connected.

My invention will be best understood by reference to the following description when taken in connection with the accompanying illustration of one specific embodiment thereof, while its scope will be more particularly pointed out in the appended claim.

Figure 1:
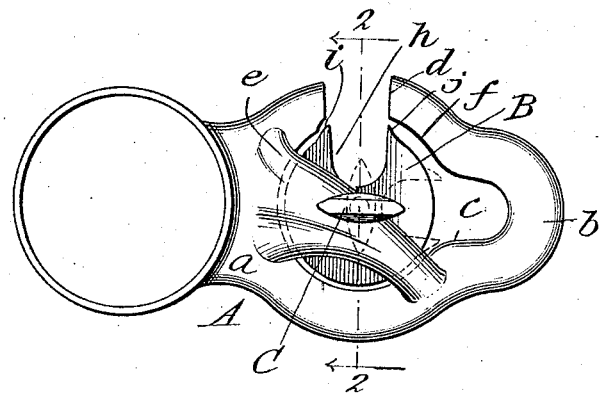
Figure 2:
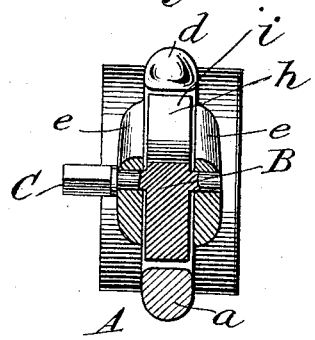
Figure 3:
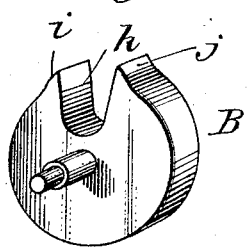

In the drawings: Figure 1 is a side elevation of my novel safety hook. Fig. 2 is a transverse section taken in the plane indicated by the line 2—2 of Fig. 1, looking in the direction of the arrows. Fig. 3 is a perspective view of the revoluble retainer comprised in the hook as said retainer appears when removed from the hook body.

Similar letters designate corresponding parts in all the views of the drawings, referring to which—

A is the body of the hook, which may be provided at its rear end with means of any suitable description for attaching it to the device by which it is to be carried without affecting my invention. The said body A is cast or otherwise formed in one piece, and comprises a shank $a$ and a loop $b$, which latter is provided in the inner side of its bight with a seat $c$, and is also provided in one side with a passage $d$. I also have the body A comprise two brace portions $e$ which are disposed at opposite sides of the body and extend diagonally from the shank of the body to the side thereof opposite the one in which the passage $d$ is provided. One of the said brace portions $e$ may be cast integral with the body at the time of manufacture thereof, while the other brace portion $e$ may be welded or otherwise permanently joined to the body after the revoluble retainer is positioned in the body.

In the inner side of the loop-shaped body A an opening $f$, of general circular outline is provided, and in the said opening the generally circular, revoluble retainer B is disposed. This retainer B is located between the brace portions $e$ of the body and held against lateral play or displacement by said brace portions. The retainer is provided at $h$ with a notch, movable from the passage $d$ to the seat $c$ and vice versa; and it is also provided at opposite sides of the mouth of notch $h$ with radial teats or projections $i$ $j$. The teat $i$ is adapted, when the retainer B is turned toward the left to register the notch $h$ with the passage $d$, to bring up against the body portion at the left of notch $d$ and limit movement of the retainer B in said direction, while the teat $j$ is adapted, when the retainer B is turned toward the right, to move the notch $h$ to a position in communication with the seat $c$, to bring up against the body portion at the side of seat $c$ that is remote from the passage $d$ and limit rotation of the retainer in that direction.

The retainer B may be mounted in the body A in any manner consonant with the purpose of my invention and which will permit of rotation of the retainer through a partial circle. I prefer, however, to provide the retainer with trunnions which are journaled in the brace portions $e$ of the body A, as best shown in Fig. 2, and on one of the said trunnions is suitably fixed a finger-piece C through the medium of which the retainer can be conveniently turned to carry the notch $h$ from registration with the passage $d$ into communication with the seat $c$.

The operation of the hook is as follows: The retainer B normally rests in and automatically returns to the position shown in Fig. 1 by reason of its solid lower portion being heavier than its upper notched portion, and hence the notch $h$ normally rests in communication with the passage $d$. While the retainer B is in said normal position, a ring, link or other open device that is to be connected to the hook is passed through passage $d$ and into the notch $h$, and then the retainer B is turned to carry the notch $h$ and the ring therein to the seat $c$, after which the ring is moved from the notch $h$ into the seat $c$, whereupon the retainer B is released and permitted to return to its normal position, when, as will be readily appreciated, the retainer B will operate to securely hold the ring in the seat $c$ and against casual disconnection. To disconnect the ring from the hook the operation described is reversed.

While I have shown and described one form of my invention, it is to be understood that I am not limited to the details or the form or relative arrangement of parts disclosed, but that modifications may be made therein without departing from the spirit thereof.

Having described my invention, what I claim and desire to secure by Letters-Patent is:

In a safety hook, the combination with a loop-shaped body having at one end a bight in which is a seat, and also having a shank at its opposite end, and further having a generally-circular opening intermediate the bight and the shank, a passage in one of its sides and in communication with said generally-circular opening, and side brace portions arranged at opposite sides of its major portion and extending diagonally between the shank and the forward portion and bridging the said generally-circular opening, of a generally-circular revoluble retainer disposed in the circular opening of the body and pivoted between the side brace portions of the body and having a notch extending inward from its periphery and also having radial teats on said periphery, at opposite sides of said notch; the rear teat being constructed to bring up against the body at the rear side of the passage therein when the notch in the retainer is coincident with the said passage, and the forward teat being movable in the body from a point at the forward side of the passage therein to that side of the seat in the bight which is remote from the passage and being constructed to bring up against the said side of the teat when the notch in the retainer is coincident with the seat.

In testimony whereof I have hereunto set my hand in presence of two subscribing witnesses.

FREDRICK E. COTTRELL.

Witnesses:
J. H. BULPITT,
E. E. SMITH.

Copies of this patent may be obtained for five cents each, by addressing the "Commissioner of Patents, Washington, D. C."